April 4, 1939.  M. G. KURTH  2,152,893
METHOD OF MAKING HELICAL PACKING RINGS
Filed Oct. 2, 1935
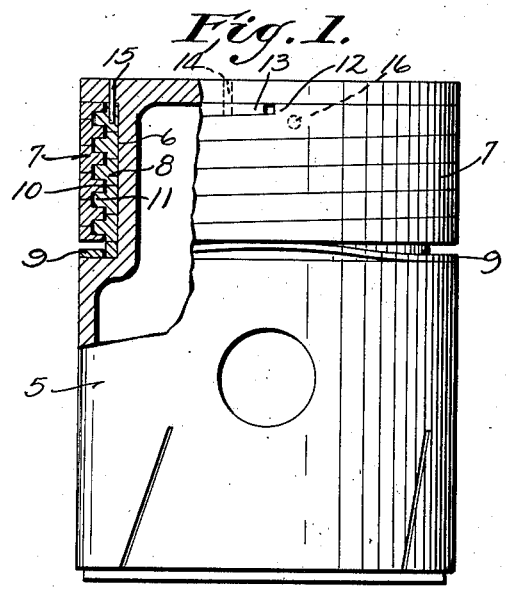
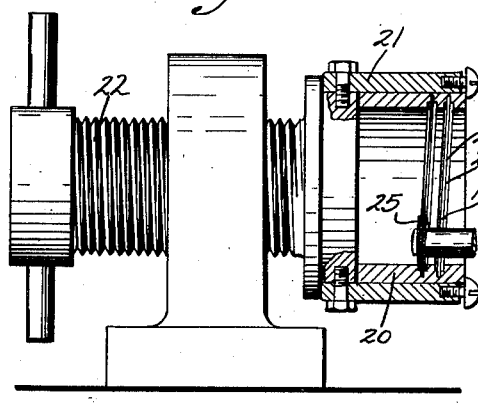
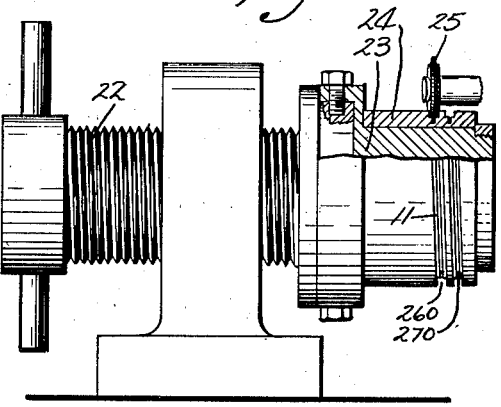
Inventor
Matthew G. Kurth
By Wheeler, Wheeler and Wheeler
Attorneys Patented Apr. 4, 1939

2,152,893

UNITED STATES PATENT OFFICE 2,152,893

METHOD OF MAKING HELICAL PACKING RINGS

Matthew G. Kurth, Madison, Wis.

Application October 2, 1935, Serial No. 43,183

1 Claim. (Cl. 29—156.6)

This invention relates to improvements in helical packing rings, and the art of manufacturing the same.

The present invention has for its primary objects the simplification of production of toothed helical packing rings.

More specifically, the present invention seeks to improve the cutting operation by first grooving helically a cylindrical metal tube section (either internally or externally) and thereafter removing such ungrooved surface portions as are necessary to intersect the groove and to free the coils of the helical piston ring, and to produce the required bearing surface.

Further advantages of the invention herein disclosed will be apparent to those skilled in the art upon a study of the following specification and claim.

In the drawing:

Figure 1 is a side elevation partly in fragmentary cross section through a piston assembly showing packing made in accordance with my invention.

Figure 2 is a fragmentary view in side elevation of the tailstock of a milling machine, showing an internally threaded helix in diagrammatic cross section in the process of manufacture.

Figure 3 is a fragmentary view in side elevation, partly in cross section, showing an externally threaded helix in the process of manufacture.

Like parts are identified by the same reference characters throughout the several views.

I shall first describe a piston and packing ring assembly illustrating a type of rings for which the present manufacturing process is adapted.

The piston 5 has a packing groove at 6 sufficiently deep in a radial direction and sufficiently elongated in an axial direction to receive compound packing comprising the helices 7 and 8, and a convoluted compression ring 9 which acts on helix 7 in an axial direction.

Each of the helices 7 and 8 is peripherally threaded, helix 7 having a thread 10 throughout its inner periphery and helix 8 having a complementary thread 11 throughout its outer periphery, the arrangement being such that the respective threads 10 and 11 are inter-engaged in the manner clearly shown in Fig. 1 and claimed in a companion application. The terminal coils of each helix will preferably be built up as shown at 12 in Fig. 1, and will be tapered toward their extremities as shown at 13, so that each helix will be cylindrical in form with planiform end surfaces to which the axis of the helix is normal.

Each of the helices will also preferably be anchored at its upper end. The terminal portion 13 of the end coil of helix 7 may be secured by a pin 14 driven through the piston head, while the end coil of helix 8 is held by a similar pin 15. A radial pin as shown at 16 may also be used if desired.

The helix 8, having a cylindrical inner surface fitted closely to the piston, will be relatively fixed thereon whereas the helix 7, being anchored only at its end, will tend to expand and contract both radially and axially. An axial pressure will tend to cause the coils of helix 7 to feed about the threads, joining it with helix 8 to reduce very slightly its axial length and produce a corresponding increase in its diameter. It is the function of the convoluted spring 9 to act on helix 7 to expand its diameter into contact with the cylinder in which piston 5 is made to operate. As the helix 7 expands due to heat, it obviously is incapable of increase in diameter, being confined within the cylinder, and accordingly the excess material is accommodated by a change in length against the compression of spring 9.

In ordinary manufacturing methods the machining of the helices 7 and 8 with their threads 10 and 11 might afford considerable difficulty and expense. In accordance with the present invention, however, a cylindrical blank 20 is mounted in a jig 21 on the tailstock screw 22 of a lathe or milling machine on which the internally threaded helix is to be produced. For the production of an externally threaded helix the jig 23 is employed, and similarly mounted to receive blank 24.

Employing a thread cutting milling tool 25, the blank 20 is helically cut as shown in Fig. 2 to provide the interthread channel 26 and a deeper groove at 27, thus forming the thread 11 and at the same time almost severing the successive coils of the helix. On the completion of this helical grooving operation performed on the interior of the blank 20, the blank is placed in a lathe and its outer periphery is cut away to a cylindrical form sufficiently small in diameter so that the helical groove 27 intercepts the cylindrical diameter at all points, thus freeing the coils of the helix from each other and leaving the packing element complete so far as its intermediate helical coils are concerned. The ends will have been left to be finished separately by ordinary machining operations to produce the parts 12 and 13 as shown in Fig. 1.

The externally threaded helix is similarly produced as shown in Fig. 3, a similar cutter 25 being used on the exterior of the blank 24 to cut a channel 260, and a deeper groove 270 constituting a mechanical converse of channel 26 in groove 27. Upon the completion of the helical milling of the channel 260 and groove 270 throughout the intermediate portion of blank 24, the blank is placed in an ordinary turning lathe and its interior periphery is turned to cut away the metal to an enlarged diameter sufficient so that its cylindrical inner surface intersects at all points the groove 270 to free the coils of the helix 8.

If the helix were first completed and thereafter machined to provide the threads on its surface, the operation would be very much more difficult. By the present method any desired form of complementary threads may be produced at will by simply selecting a milling cutter 25 of suitable contour. I have shown only threads of square cross section, but it will be apparent that other threads, some of which are shown in my companion applications, may readily be provided.

I claim:

The process of making a helical threaded packing element, which process includes the cutting of a relatively wide groove in a tubular blank to provide a helical thread thereon, the cutting of a groove narrower than the first mentioned groove and in the bottom thereof between successive turns of the thread formed on said blank, and the peripheral machining of the blank to intersect the narrower groove, whereby to free the coils of a helix on which such thread is carried.

MATTHEW G. KURTH.